H. L. CRUTTENDEN.
DENTAL PARALLEL CAVITY FORMER.
APPLICATION FILED MAR. 22, 1921.
1,407,840.
Patented Feb. 28, 1922.
2 SHEETS—SHEET 1.
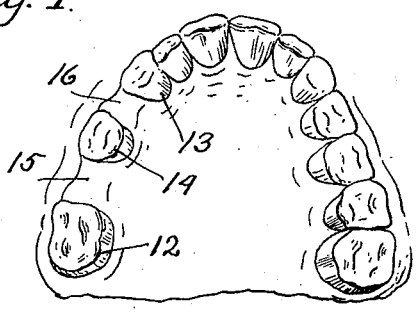
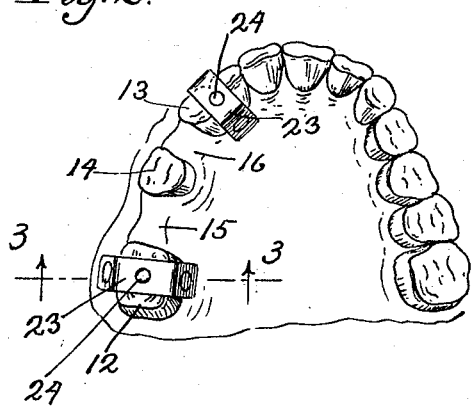
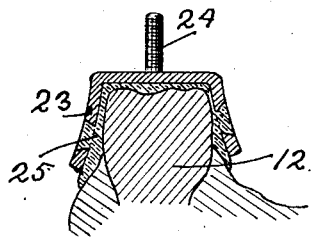
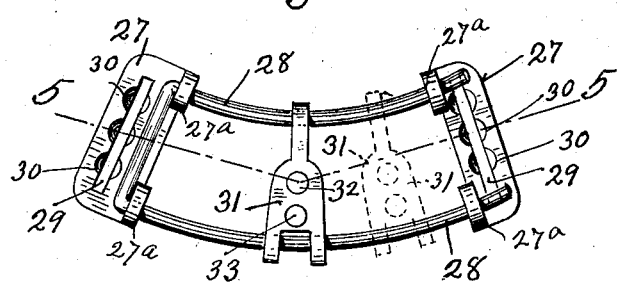
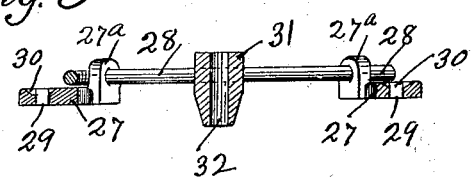
Inventor
Henry L. Cruttenden
By his Attorneys

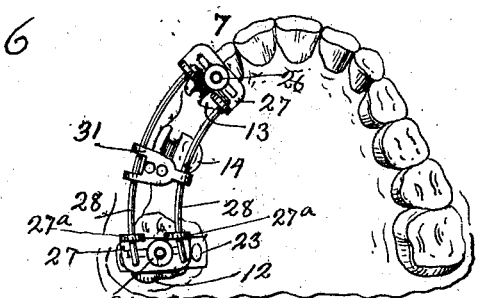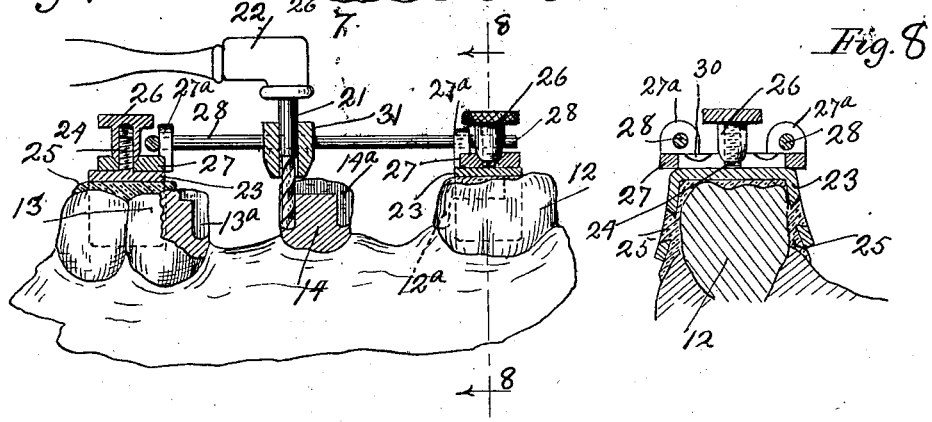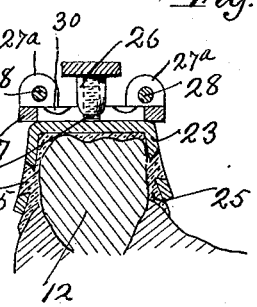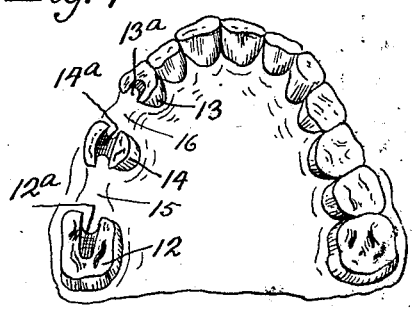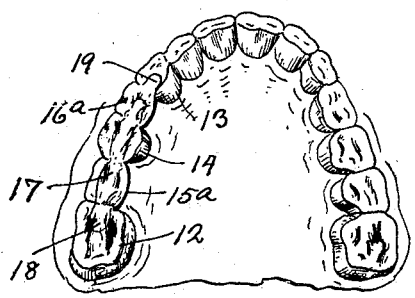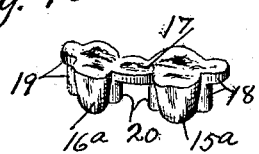

UNITED STATES PATENT OFFICE.

HENRY L. CRUTTENDEN, OF NORTHFIELD, MINNESOTA.

DENTAL PARALLEL-CAVITY FORMER.

1,407,840.  Specification of Letters Patent.  Patented Feb. 28, 1922.

Application filed March 22, 1921. Serial No. 454,446.

*To all whom it may concern:*

Be it known that I, HENRY L. CRUTTENDEN, a citizen of the United States, residing at Northfield, in the county of Rice and State of Minnesota, have invented certain new and useful Improvements in Dental Parallel-Cavity Formers; and I do hereby declare the following to be a full, clear, and exact description of the invention such as will enable others skilled in the art to which it appertains to make and use the same.

My invention relates to that branch of the dental art that has to do with the application of bridge work by the use of anchoring inlays. Under the older practice, crowns were used as the anchors for bridge work, but as above indicated, in accordance with later and better practice, inlays instead of crowns are now generally used.

In applying bridges, at least two anchoring inlays are always used and often or very frequently, in addition to the terminal inlays, there will be one or more intermediate inlays. When several inlays are used, it is important that the inlay seats formed in the teeth should all have perpendicular walls, that is, their walls should have the same angle to a common plane, so that the completed bridge, including the several inlays, may, as an entirety, be accurately seated without distortion of binding any of the parts of the bridge or of the teeth.

My invention provides a dental tool guide that will insure quick and very accurate work of the character above indicated as desirable. A commercial form of this improved dental device is illustrated in the accompanying drawings, wherein like characters indicate like parts throughout the several views.

Referring to the drawings:—

Fig. 1 indicates, diagrammatically, what we assume to be the upper teeth of a human jaw, two teeth having been extracted, leaving one tooth in a space to be bridged.

Fig. 2 is a view corresponding to Fig. 1 but showing temporary so-called abutment anchors applied to the two teeth between which the bridge is to be extended;

Fig. 3 is an enlarged section on the line 3—3 of Fig. 2;

Fig. 4 is a plan view of the dental guide removed from working position;

Fig. 5 is a vertical section on the line 5—5 of Fig. 4;

Fig. 6 is a view corresponding to Fig. 2, but with the guide operatively applied;

Fig. 7 is an enlarged elevation with some parts sectioned on the line 7—7 of Fig. 6 and showing a dental drill operatively held by the guide;

Fig. 8 is a section on the line 8—8 of Fig. 7;

Fig. 9 is a view corresponding to Fig. 1, but showing the teeth formed with inlay seats and ready to receive the complete bridge;

Fig. 10 is a perspective showing the complete bridge ready for application to the teeth as prepared, as shown in Fig. 9; and Fig. 11 is a view corresponding to Fig. 9, but with the bridge, shown in Fig. 10, applied in working position.

The numerals 12, 13 and 14 indicate the three teeth to which the bridge is to be applied and numerals 15 and 16 indicate tooth spaces in which artificial teeth are to be applied by a bridge. For the proper application of the bridge, the teeth 12, 13 and 14 should be drilled out and formed with inlay seats $12^a$, $13^a$ and $14^a$, respectively. In accordance with the best practice, the inlay seats $12^a$ and $13^a$ should be in the form of pockets, facing, the one toward the other, on the arc of a curve following the line of the teeth; but the seat $14^a$ of the intermediate tooth 14 should be substantially in the form of an inverted U-shaped channel cut intermediately in said tooth along the arc of the line of the teeth, (see particularly Fig. 7 and 9). Obviously, the walls of all of these inlay seats should be perpendicular to, or at a common angle to a common plane, so that corresponding walls thereof will be parallel.

The bridge designed for application to the teeth prepared, as shown in Fig. 9, should comprise two artificial teeth $15^a$ and $16^a$ of proper size and form to fill the tooth spaces 15 and 16, respectively. These artificial teeth will preferably be of porcelain, secured in the usual or any suitable way, to a metallic bridge 17. At its ends, the bridge 17 has inlays 18 and 19 cast to perfectly fit, respectively, the inlay seats $12^a$ and $13^a$, and at its intermediate portion, said bridge has an integral U-shaped inlay cast to perfectly fit the seat $14^a$ of the intermediate tooth 14.

It is now obvious that if this bridge with this inlay is to be made to perfectly fit the inlay seats of the tooth, and at the same time, be capable of being set in position or removed without distortion of the parts of the bridge or of the teeth, the side walls of the seats 12ª, 13ª and 14ª must be parallel or perpendicular to a common plane, which common plane would be the plane of contact of the teeth shown in the drawings.

The commercial form of the tool for performing the work indicated, will now be described. The dental tool to be guided thereby, will be a drill 21, or like cutting tool, which, as is customary, will be held in the socket of a hand-piece 22, (see Fig. 7), and will usually be driven through the customary flexible shaft or belt and pulley connection, not shown.

The numeral 23 indicates abutment anchors, as shown, in the form of U-shaped metal clips, provided with upstanding threaded studs 24 and adapted to be securely, but temporarily applied to the teeth 12 and 13 by modeling compound 25, (see particularly Figs. 7 and 8). Working on the threaded studs 24 are cap-nuts 26, or the like, preferably having rounded lower ends. So-called yoke abutments 27 are provided with upstanding ears 27ª through which the parallel curved sides of a guide-yoke 28 are passed. The yoke 28 is preferably a round rod or heavy wire bent to the form, best shown in Figs. 4 and 6. The flat bodies or bases of the yoke abutments 27 have slots 29, through which the studs 24 are passed, when said abutments are seated on the anchors 23. As shown, said abutments are formed with countersunk seats 30, spaced along the slots 29 and with which the tapered lower ends of the nuts 26 are adapted to engage to hold said abutments in different transverse adjustments.

Mounted to slide on the curved rods of the yoke 28, is a guide-head 31, formed with two drill or tool guiding holes 32 and 33. By reference to Fig. 5, it will be noted that that part of the guide-head 31 in which the holes 32 and 33 are formed, is extended considerably farther below than above the guide-rods 28. Hence, by reversing the said head, its guide holes can be extended farther above than below said guide-rods and this is desirable when working on an intermediate tooth that has too great projection for the first noted adjustment. For most purposes, one drill hole is sufficient, but the two drill holes give or provide for a larger range of adjustment.

The use of the device described is probably evident from the foregoing description, but the following brief statements may be made.

The abutment anchors or clips 23 must, of course, first be applied and secured by the compound 25 and this compound allowed to harden before the tool is put into use. When the yoke abutments and yoke are applied as described and properly adjusted and the drill is passed through one of the guide holes of the guide-head 31, said drill can be moved freely from one tooth to the other, but will always be held upright or parallel to its original position. When one or the other of the nuts 26 is loose, the drill may also be moved laterally but will still be held parallel to its original position and free for straight line vertical movements. The drill or some other tool may thus be used for doing the work indicated or any other similar kind of work and the operator may be sure that inlay seats, thus formed, will have the required parallel walls, necessary for the purposes stated.

When the teeth have been prepared as shown in Fig. 9, the drill guiding device may be quickly removed and it is then a comparatively easy matter to make the bridge shown in Fig. 10 or any other bridge of the general character noted and in which the bridge is provided with several anchoring inlays.

What I claim is:—

1. A dental parallel cavity former, adapted for application to teeth of the human jaw comprising a head-guide, means for anchoring said head-guide to spaced teeth, and a tool guide-head slidable on said head-guide and having a guide passage through which a drill or similar dental tool may be freely passed.

2. A dental parallel cavity former, adapted for application to teeth of the human jaw comprising a head-guide, means for anchoring said head-guide to spaced teeth, and a tool guide-head slidable on said head-guide and having a guide passage through which a drill or similar dental tool may be freely passed, said guide-head projecting farther below than above said head-guide but being reversible thereon to reverse said relation.

3. A dental parallel cavity former, adapted for application to teeth of the human jaw comprising a head-guide, means for anchoring said head-guide to spaced teeth, and a tool guide-head slidable on said head-guide and having a guide passage through which a drill or similar dental tool may be freely passed, said head-guide being laterally adjustable in respect to its securing means.

4. A dental parallel cavity former, adapted for application to teeth of the human jaw of the kind described comprising abutment anchors adapted to be temporarily secured to spaced teeth, abutments applied to said anchors, laterally spaced guide-rods supported by said abutments, and a guide-head slidable on said guide-rods and having a vertical passage for guiding a drill or the like to its work on the teeth, said guide-rods being curved on the arch of different concentric circles.

5. A dental device of the kind described comprising abutment anchors adapted to be temporarily secured to spaced teeth, abutments applied to said anchors, laterally spaced guide-rods supported by said abutments, and a guide-head slidable on said guide-rods and having a vertical passage for guiding a drill or the like to its work on the teeth, said abutments being independently adjustable on said anchors in a direction transversely of the movement of said head on said guide-rod.

6. A dental device of the kind described comprising abutment anchors adapted to embrace and to be temporarily secured to certain spaced teeth, by modeling compound, and having threaded studs, yoke anchors seated on said abutments and having slots through which the threaded studs thereof are passed, nuts on said studs for adjustably securing said abutments to said anchors, a guide-yoke supported by said abutments, and a guide-head slidable on said yoke, said guide-head having a vertical passage for guiding the drill or the like to its work on the teeth with a parallel movement.

7. A dental device of the kind described comprising abutment anchors adapted to embrace and to be temporarily secured to certain spaced teeth, by modeling compound, and having threaded studs, yoke anchors seated on said abutments and having slots through which the threaded studs thereof are passed, nuts on said studs for adjustably securing said abutments to said anchors, a guide-yoke supported by said abutments, and a guide-head slidable on said yoke, said guide-head having a vertical passage for guiding the drill or the like to its work on the teeth with a parallel movement, the rods of said yoke being curved on concentric circles.

In testimony whereof I affix my signature.

HENRY L. CRUTTENDEN.